US006817246B1

United States Patent
Rottner et al.

(10) Patent No.: US 6,817,246 B1
(45) Date of Patent: Nov. 16, 2004

(54) DISTORTION DETECTOR

(75) Inventors: Franz Rottner, Worms (DE); Siegfried Pieper, Worms (DE); Reinhard Winkler, Potsdam (DE)

(73) Assignee: Innotec Europe GmbH, Worms (DE)

( * ) Notice: Subject to any disclaimer, the term of this patent is extended or adjusted under 35 U.S.C. 154(b) by 0 days.

(21) Appl. No.: 10/070,509
(22) PCT Filed: Jun. 23, 2000
(86) PCT No.: PCT/EP00/05828
§ 371 (c)(1),
(2), (4) Date: Mar. 5, 2002
(87) PCT Pub. No.: WO01/18487
PCT Pub. Date: Mar. 15, 2001

(30) Foreign Application Priority Data

Sep. 6, 1999 (DE) .......................... 199 42 332

(51) Int. Cl.[7] .............................................. G01N 29/00
(52) U.S. Cl. .............................. 73/573; 73/650; 73/657
(58) Field of Search ......................... 73/573, 574, 575, 73/589, 596, 655, 657, 605, 650

(56) References Cited

U.S. PATENT DOCUMENTS

| 3,708,231 | A | | 1/1973 | Walters ........................ 356/152 |
| 3,745,812 | A | * | 7/1973 | Korpel ........................... 73/604 |
| 4,199,253 | A | * | 4/1980 | Ross ............................ 356/5.04 |
| 4,222,262 | A | * | 9/1980 | Batie et al. ....................... 73/81 |
| 4,253,723 | A | * | 3/1981 | Kojima et al. ................. 235/457 |
| 4,338,822 | A | * | 7/1982 | Yamaguchi et al. ............ 73/643 |
| 4,694,690 | A | | 9/1987 | Jones et al. ..................... 73/146 |
| 4,892,701 | A | * | 1/1990 | Mauvieux et al. ........... 376/258 |
| 4,959,552 | A | * | 9/1990 | Saffert et al. ........... 250/559.26 |
| 5,067,352 | A | * | 11/1991 | Floret ............................ 73/583 |
| 5,170,366 | A | * | 12/1992 | Passarelli ....................... 702/41 |
| 5,333,495 | A | * | 8/1994 | Yamaguchi et al. ........... 73/105 |
| 5,450,752 | A | * | 9/1995 | White et al. ................... 73/643 |
| 5,495,331 | A | * | 2/1996 | Wulf ............................ 356/328 |
| 5,691,476 | A | * | 11/1997 | Madaras ....................... 73/644 |
| 5,746,561 | A | * | 5/1998 | Nygren et al. .............. 411/368 |
| 5,808,201 | A | * | 9/1998 | Hugentobler ................. 73/643 |
| 6,006,593 | A | * | 12/1999 | Yamanaka ..................... 73/105 |
| 6,348,968 | B2 | * | 2/2002 | Autrey et al. ................ 356/432 |
| 6,356,846 | B1 | * | 3/2002 | Habeger et al. ............... 702/40 |
| 6,529,329 | B2 | * | 3/2003 | Dang ........................... 359/618 |
| 6,609,425 | B2 | * | 8/2003 | Ogawa ......................... 73/608 |

FOREIGN PATENT DOCUMENTS

| DE | 3033103 | 4/1982 |
| DE | 19711964 | 10/1998 |
| FR | 2578974 | 9/1986 |

* cited by examiner

Primary Examiner—Hezron Williams
Assistant Examiner—Jacques M. Saint-Surin
(74) Attorney, Agent, or Firm—Davidson, Davidson & Kappel, LLC

(57) ABSTRACT

A device for detecting different conditions of a component, such as distorted conditions, movements and loaded conditions. Said device comprises a transmitter and a receiver which are located independently on at least one component at a distance from one another and an evaluation unit. The transmitter emits an electromagnetic wave (such as e.g. a laser beam), or a focused particle beam to the receiver. The spatial resolution can be increased by multiple reflections from a mirror and a semi-transparent mirror.

23 Claims, 3 Drawing Sheets

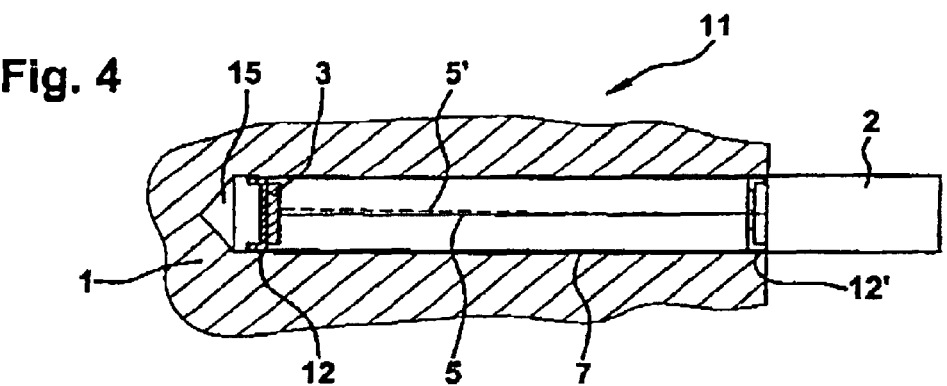
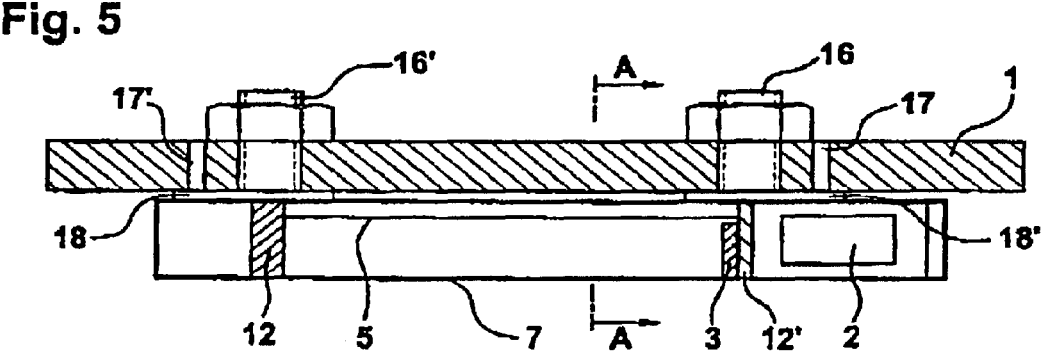
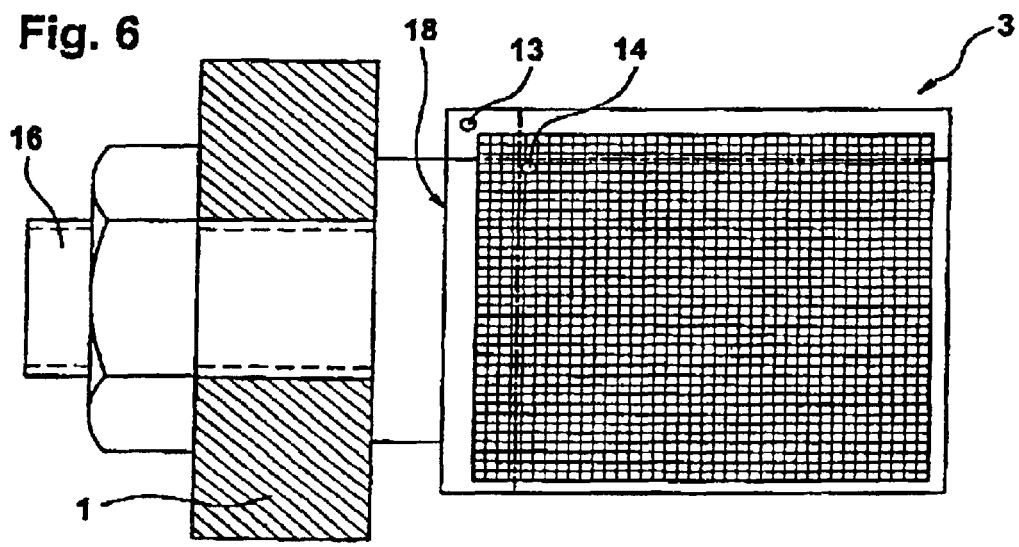

DISTORTION DETECTOR

FIELD OF THE INVENTION

The invention relates to a device to detect various states such as deformation states, movements and loading states of a component, having a transmitter and a receiver that are arranged independently and at a distance from each other on at least one component, and the invention also relates to an evaluation unit.

BACKGROUND

A transducer of deformation states of a component is already known from U.S. Pat. No. 5,170,366. This transducer emits acoustic signals by means of a transmitter provided in or on the component and it receives acoustic signals with a receiver arranged on or in another place on the component. The various loading states of the component such as, for example, deformation due to stretching, compression or torsion result in various delay time differences of the acoustic signals. In the case of stretching of the component, the propagation rate decreases while in the case of a compression, the propagation rate of the acoustic signals increases. In order to obtain a correlation between the measured delay times and the component load, it is necessary to determine the possible loading states and thus the various delay times between the transmitter and the receiver in a simulation phase. Moreover, it is necessary to equalize and evaluate all of the parameters that have an influence on the propagation rate and that cannot be ascribed to a loading of the component such as, for instance, the temperature or fault signals.

U.S. Pat. No. 3,708,231 shows a device to detect angular changes of a component, whereby the reflection behavior of a light beam on a slanted, plane surface is evaluated. Component deformations such as, for example, bending, cannot be detected with this arrangement. French Patent No. 2,578,974 relates to a device to determine a force or the movement resulting from said force. Here, inside a flexible housing, there is a light transmitter and, opposite from it in the housing, an optical receiver. Due to the optical property or characteristic of the light that propagates in the housing, a deformation of the housing can be detected. A small, dynamic relative movement between the transmitter and the receiver cannot be detected with such a device.

SUMMARY OF THE INVENTION

The invention is based on the objective of creating and configuring a deformation transducer in such a way that a rapid and simple determination of various loading states of the component is possible.

This objective is achieved according to the invention in that the transmitter emits a focused or punctiform electromagnetic wave or a focused acoustic wave or a focused particle beam outside of the component towards the receiver. The result of this is that the transmitter and the receiver are effectively linked to each other via the light beam so that, for example, deformations of the component have an effect on the relative position between the transmitter and the receiver and thus also on the path of the light beam relative to the receiver. This device is suitable as a weighing device since the deformation of a component allows a conclusion to be drawn about the force acting upon it. However, other influencing variables that entail a deformation of the component such as, for example, dynamic loads or an unbalance, can also be ascertained. For such a position determination, it is also conceivable to use a pressure wave or sound wave or else a water jet.

In this context, it is also advantageous for the transmitter and the receiver to each be arranged in a holder on the component in such a way that a deformation of the component is equivalent to the position shift of the electromagnetic wave or of the light beam on the receiver. Thus, every deformation of the component leads to a change in the light beam path relative to the receiver. This change serves to determine the component deformation or the component oscillation or else it is equivalent thereto. This also offers the possibility—via the deformation state of the component—to detect the force that causes the deformation; that is to say, for example, the weight of a load like that of a train on a railway track that is deformed under its load can be determined. The dynamic weighing of a train is also an option.

According to an embodiment, an additional possibility is that, within the beam path of the light beam, there is at least one reflector or one reflective surface and that the light beam is reflected by the reflector or by the reflective surface towards the receiver, whereby the reflector is connected to the component via a holder. For this purpose, it is also advantageous for the transmitter and the receiver to be arranged on a shared side of the housing opposite from the reflector or from the reflective surface. Therefore, the beam path of the light beam is lengthened two-fold, four-fold or multiple-fold depending on the number of reflectors. Thus, the deviation of the light beam resulting from the component deformation is increased by this lengthening factor, which leads to a considerable resolution of the component deformation. Consequently, any slight deformation can be resolved and determined. The arrangement of the reflector on the component has the advantage that the transmitter-receiver unit in its entirety is arranged on the component by means of a separate holder.

Finally, according to a preferred embodiment of the solution according to the invention, it is provided that the receiver has a light-sensitive surface such as a PSD transducer or an image processing element and the light-sensitive surface ensures a resolution of at least 3000 d to 6000 d. This value, which is common in weighing technology, is determined from the quotient of the length ratios of the maximum measurable deviation of the light beam to the light-sensitive surface and the diameter of the smallest optical unit. In this manner, the deviations of the reflected light beam relative to its starting position and thus the component deformation can be determined on the basis of the above-mentioned resolution. Here, it must be noted that the deviation of the light beam is already enlarged by the corresponding factor due to the multiple reflection of the beam path.

An especially important aspect for the present invention is that the transmitter should emit at least one light beam such as a laser beam. Thus, it is also possible that the component deformation can be evaluated by means of two or three light beams whose frequency and/or position differ. The use of a laser beam is extremely advantageous in terms of the scatter or the position detection. The use of another medium such as, for example, water, for generating a beam path is also conceivable.

In conjunction with the design and arrangement according to the invention, it is advantageous for the transmitter, the receiver and the reflector to be arranged in a flexible housing. The housing serves to protect the beam path from external influences. By designing the housing so as to be flexible, it is possible to prevent the relative movements between the various elements due to component deformation.

Regarding the beam path lengthening, it is advantageous for at least one semi-transparent layer to be arranged inside the beam path leading from the transmitter to the receiver. In this manner, one part of the intensity of the emitted light beam is reflected and the other part of the intensity of the beam path continues further. Thus, a position image of the beam path on the receiver is obtained which indicates various resolution stages of the component deformation corresponding to the number of reflections.

For this purpose, it is also advantageous for the transmitter and/or the receiver and/or the housing to be round or rectangular in shape. Depending on the potential component deformation or on the area of application, an optimal utilization of the available surfaces can be achieved in this manner. The round housing shape serves essentially for the use of the transducer in the form of a drill core or as a drill core substitute. This core is inserted into a bore or received by it in order to determine the component deformations there. Thus, the transducer can be used, for instance, in a foundation in order to determine the deformations or oscillations present there.

It is also advantageous for the receiver or the PSD transducer to be associated with an evaluation logic circuit in order to determine the deformation of the component. The component deformation manifested by the deviation of the reflected light is determined by means of an evaluation logic circuit. Consequently, the transducer can also be employed as a weighing member.

In conjunction with the design and arrangement according to the invention, it is advantageous for the transmitter and the receiver to be arranged together on a plate that is clamped to a component by means of at least one clamping element, whereby the clamping element has two pointed or round contact parts and at least one bore that matches the plate. Via these bores, the clamping element is put into contact, on the one hand, with the plate and, on the other hand, with the railway track, so that the deformations of the component are transmitted to the transmitter and to the receiver. The resultant contact surface is linear here, as a result of which a non-redundant support is achieved. This avoids the need for complicated drilling or gluing to the component.

Finally, it is advantageous for the transmitter and the receiver—together in one holder—and for the reflector—independent of and at a distance from them in another holder—to be arranged on the component in a shared housing.

BRIEF DESCRIPTION OF THE DRAWINGS

Additional advantages and details of the invention are explained in the patent claims and in the description, and they are illustrated in the figures, which show the following:

DETAILED DESCRIPTION

Figure 1:
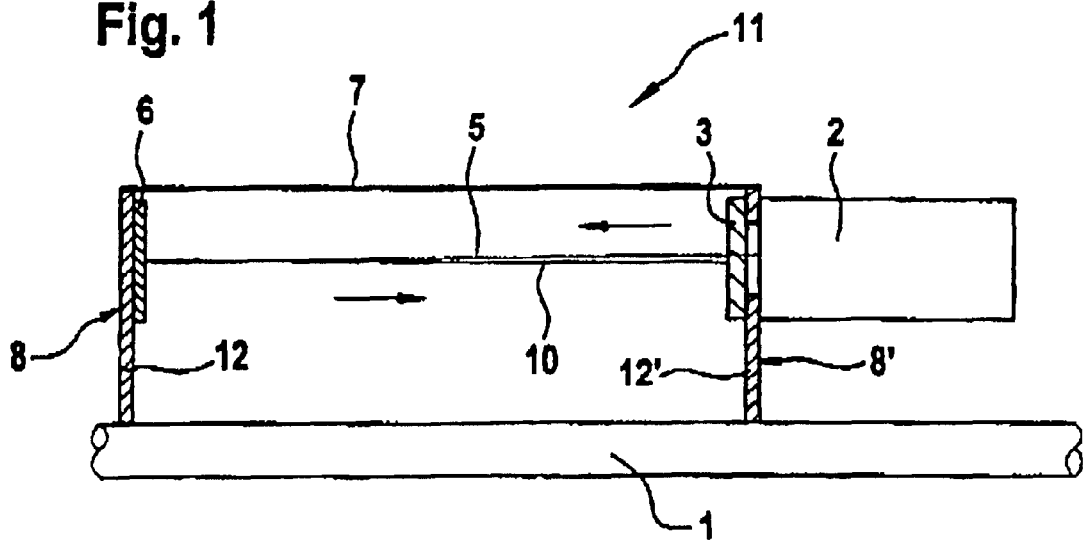
FIG. 1—a cross sectional representation of the transducer from the side in the unstressed component, FIG. 2—a cross sectional representation of the transducer from the side in the stressed component, FIG. 3—a receiver in a front view, FIG. 4—a sectional view of the transducer as a drill core, FIG. 5—a sectional view of the transducer with a screwed connection to the component, FIG. 6—the sectional view A—A according to FIG. 5, FIG. 7—the representation according to FIG. 1 with the light beam reflected multiple times, FIG. 8—a sectional view of a holding means.

FIG. 1 uses reference numeral 1 to designate a component on whose side or side surface a load or deformation transducer 11 is arranged. This component can be a railway track, an axle or a support bar. The deformation transducer 11 can be clamped, screwed or glued onto the component.

The transducer 11 is equipped with a transmitter 2 and a receiver 3 on the right-hand side of its housing 8'. The transmitter 2 emits a light or laser beam 5 towards a left-hand housing side 8, where said beam strikes a reflector 6 and is reflected. A reflected light beam 10 then strikes the receiver 3 that is provided on the transmitter side. Depending on the degree of parallelism of transmitter 2 and reflector 6, the transmitted light beam 5 is identical to the reflected light beam 10 or it deviates somewhat as shown in FIG. 1, in other words, an exit point 13 of the transmitted light beam and a striking point 14 of the reflected light beam are at a slight distance. This position is now selected as the reference for all other loading states of the component. The force that caused the deformation such as, for example, the weight of a freight train, is determined on the basis of the deformation of the component.

The transmitter-receiver unit on the right-hand side as well as the reflector 6 on the left-hand side are each firmly attached to the component 1 by means of a holder 12, 12'.

Figure 2:
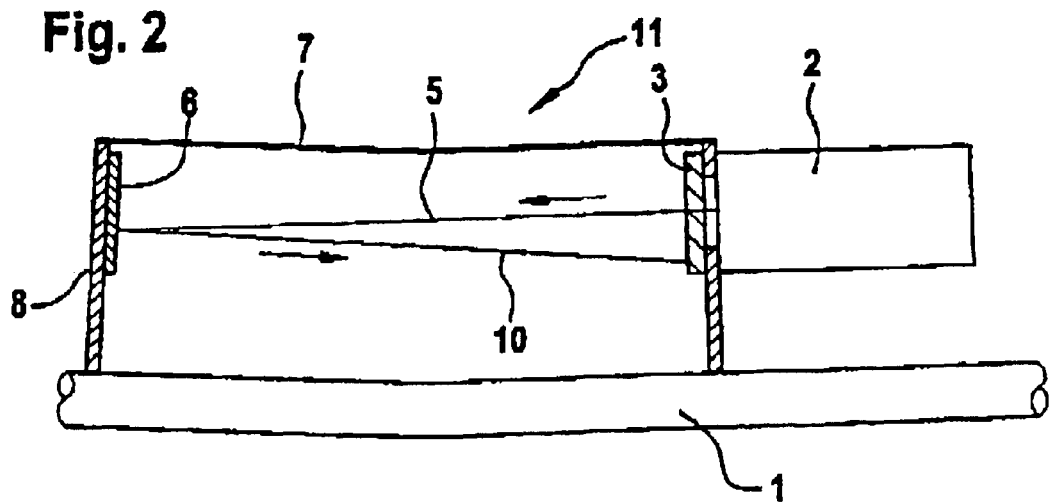

Both holders 12, 12' are surrounded by a shared flexible housing 7 that shields the transducer against external influences and that ensures the freedom of motion of both sides during a component deformation according to FIG. 2.

FIG. 2 shows the component deformed due to an external load. The left-hand and right-hand holders 12, 12' are thus positioned slanted towards each other corresponding to the deformation. The result is that the angle of incidence of the transmitted light or laser beam 5 and the emergent angle of the reflected laser beam 10 differ from the reference position as shown in FIG. 1 and the exit point 13 of the transmitted laser beam and the striking point 14 of the reflected laser beam are at a distance that diverges from the reference position.

Figure 3:
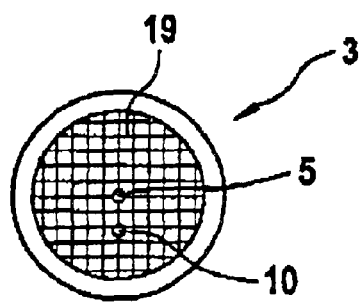

FIG. 3 shows the receiver 3 with the emerging laser beam 5 and the exit point 13 as well as the striking point 14 of the reflected laser beam. The receiver is circular in shape and has a light-sensitive surface 19 by means of which the position of the incident laser beam is determined.

FIG. 4 shows the transducer in the form of a drill core, that is to say, it is guided through a bore 15 provided in the component to be tested. Due to the holder 12, 12' provided on both sides, the deformation caused in the component by the external load has an effect on the transducer or on the parallelism of the receiver 3 and the reflector 6. The housing 7 ensures the guidance properties needed for introducing the transducer 11 so that the parallelism of the receiver 3 and of the reflector 6 in the reference state is virtually assured. In this embodiment, the transmitter 2 is arranged opposite from the receiver 3. In the case of component deformation, the light beam 5 is deflected from its reference position. Therefore, a deflected light beam 5' strikes the receiver 3 at a position that diverges from the reference position, and the component deformation can be determined.

FIG. 5 shows another possibility for arranging or attaching the transducer 11 to the component 1. For this purpose, the two holders 12, 12' each have a fixed connection 18, 18' with a stud bolt 16, 16'. The stud bolts 16, 16' are screwed to the component 1 or threaded into it. The housing 7 surrounds the transmitter 2 and the receiver 3. The attachment strength or form-fit between the stud bolts 16, 16' and the component 1 is ensured by a pin connection 17, 17' that prevents torsion around the center axis of the stud bolt in question.

FIG. 6 shows the section A—A according to FIG. 5. The receiver 3 is rectangular in shape, whereby the transmitter 2 is arranged on the edge in the vicinity of a corner or on the upper left, and the reflected laser beam 10 in the reference state likewise strikes in the vicinity of this corner, that is to say, the exit point 13 and the striking point 14 of the laser beam are both arranged in the vicinity of a corner of the rectangular transmitter-receiver unit 2, 3.

Figure 7:
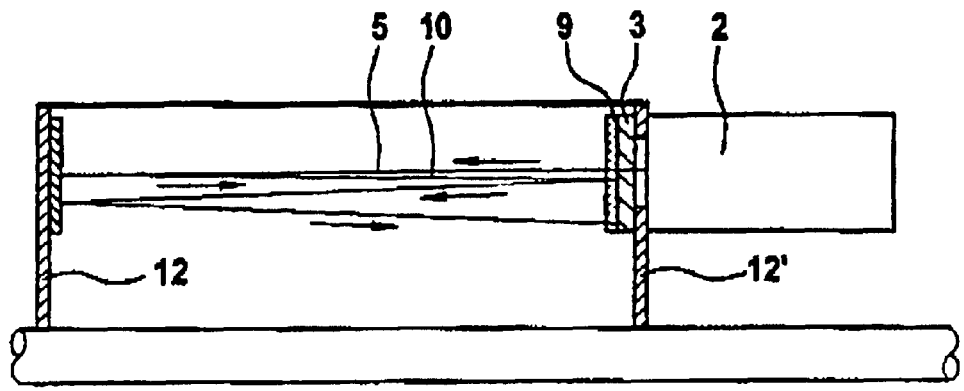

According to FIG. 7, it is also possible to place a semi-transparent layer 9 in front of the receiver 3 so as to allow part of the reflected laser beam 10 to pass through, i.e. part of the intensity of the laser beam strikes the receiver, while the remaining part of its intensity is reflected once again in the direction of the reflector 6, which then allows it to strike the receiver 3 a second time.

Figure 8:
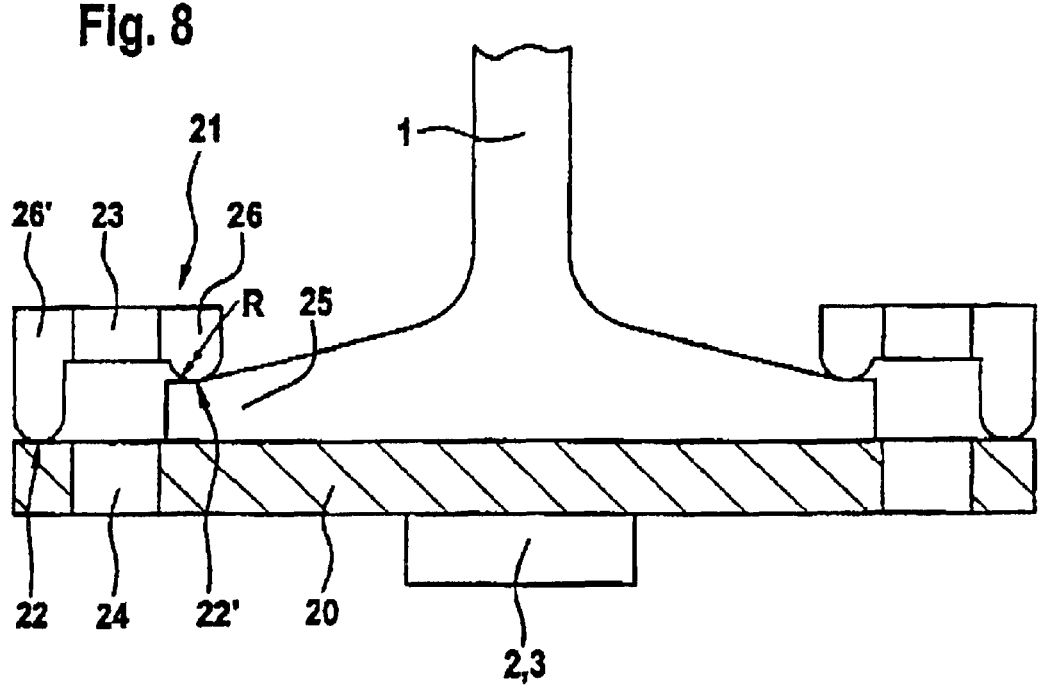

In FIG. 8, the reference numeral 1 designates a railway track that is connected via a plate 20 and two bridge-shaped or U-shaped clamping elements 21 to the transmitter 2 and the receiver 3. For this purpose, the plate 20 has at least one bore 24 in the area of both ends, said bore being located coaxially to a bore 23 of the clamping element 21 in question. Moreover, the clamping element 21 has two semi-circular contact parts 22, 22' that lie linearly against the plate 20 as well as against the railway track 1. The transmitter 2 and the receiver 3 are located underneath the plate. Here, the clamping element 21 rests with a short leg 26 on a foot 25 of the railway track 1 and with a long leg 26' on the plate 20. Thus, the plate 20 is brought into contact with the railway track 1 and a deformation of the railway track can be determined.

What is claimed is:

1. A device to detect a state of a component, the device comprising:
 a receiver disposed on the component and having a light-sensitive surface;
 a transmitter disposed on the component at a distance from the receiver and configured to emit a focused beam outside of the component to the receiver; and
 an evaluation unit, wherein the transmitter and the receiver are disposed in such a way that a deformation of the component effects a corresponding position shift of the beam.

2. The device as recited in claim 1, wherein the state of the component include at least one of a deformation state, a loading state, and a movement of the component.

3. The device as recited in claim 1 wherein the receiver includes at least one of a PSD transducer and an image processing element.

4. The device as recited in claim 1 wherein the focused beam includes at least one of a focused light beam, a focused electromagnetic wave, a focused acoustic wave, and a focused particle beam.

5. The device as recited in claim 1 wherein the transmitter and the receiver are each disposed in a holder on the component.

6. The device as recited in claim 1 further comprising a reflector within a path of the beam.

7. The device as recited in claim 6 wherein the reflector reflects the beam towards the receiver.

8. The device as recited in claim 6 further comprising a holder and wherein the reflector is connected to the component via the holder.

9. The device as recited in claim 6 wherein the transmitter is disposed in a first holder and the reflector is disposed at a distance from the transmitter in a second holder, and the transmitter, receiver, and reflector are disposed on the component in a shared housing.

10. The device as recited in claim 1 wherein the light-sensitive surface of the receiver has a resolution of at least 1000 d.

11. The device as recited in claim 1 wherein the transmitter emits at least one laser beam.

12. The device as recited in claim 1 wherein the transmitter, the receiver and the reflector are disposed in a flexible housing.

13. The device as recited in claim 12 wherein the transmitter and the receiver are disposed on a first side of the housing and the reflector is disposed on an opposite second side of the housing.

14. The device as recited in claim 12 wherein the housing has one of a round and a rectangular shape.

15. The device as recited in claim 12 wherein the housing is in the form of a drill bore in the component.

16. The device as recited in claim 1 wherein the receiver is associated with an evaluation logic circuit in order to determine the deformation of the component.

17. The device as recited in claim 1 further comprising at least one semi-transparent layer disposed within a path of the beam from the transmitter to the receiver.

18. The device as recited in claim 1 wherein at least one of the transmitter and the receiver has a round shape.

19. The device as recited in claim 1 wherein at least one of the transmitter and the receiver has a rectangular shape.

20. The device as recited in claim 1 wherein the focused beam is a punctiform beam.

21. The device as recited in claim 1, wherein the receiver and the transmitter are disposed on an interior of the component.

22. A device to detect various states of a component, the device comprising:
 a clamping element having at least two contact parts and defining a first bore;
 a plate clamped to the component using the clamping element, the plate defining a second bore aligned with the first bore;
 a receiver having a light-sensitive surface disposed on the plate;
 a transmitter disposed on the plate at a distance from the receiver, the transmitter configured to emit a focused beam outside of the component to the receiver.

23. The device as recited in claim 22 wherein the focused beam is a punctiform beam.

* * * * *